United States Patent [19]
Kane et al.

[11] 3,997,492
[45] Dec. 14, 1976

[54] HIGH HLB LATEX POLYMERS
[75] Inventors: James Kane, Park Forest, Ill.; R. James Shields, III, Munster, Ind.
[73] Assignee: Nalco Chemical Company, Oak Brook, Ill.
[22] Filed: Jan. 22, 1975
[21] Appl. No.: 542,982
[52] U.S. Cl. .............. 260/29.6 WQ; 260/29.6 H; 260/29.6 HN; 260/27.6 MH
[51] Int. Cl.² ........................................ C08L 33/26
[58] Field of Search ............ 260/29.6 WQ, 29.6 H, 260/29.6 HN, 29.6 MH

[56] References Cited
UNITED STATES PATENTS

| | | |
|---|---|---|
| 2,982,749 | 5/1961 | Friedrich et al. ......... 260/29.6 WQ |
| 3,284,393 | 11/1966 | Vanderhoff et al. ...... 260/29.6 HN |
| 3,624,019 | 11/1971 | Anderson ................... 260/29.6 HN |
| 3,734,873 | 5/1973 | Anderson et al. ......... 260/29.6 HN |
| 3,826,771 | 7/1974 | Anderson et al. ............ 260/29.6 H |

Primary Examiner—M. J. Welsh
Attorney, Agent, or Firm—John G. Premo; Robert A. Miller; Barry W. Sufrin

[57] ABSTRACT

Stable water-in-oil emulsion of water soluble polymers are disclosed. The emulsions are formed by selecting a suitable continuous phase consisting of an inert hydrocarbon liquid followed by selecting suitable surfactants based on the properties of the organic liquid.

18 Claims, No Drawings

HIGH HLB LATEX POLYMERS

Water-in-oil emulsions of water soluble vinyl addition polymers prepared from water soluble ethylenically unsaturated monomers have become increasingly important in many areas. These areas include the use of these polymers in the treatment of municipal and industrial wastes, papermaking, as additives to control drift, in many other applications. Typically these polymers are made from water soluble ethylenically unsaturated monomers which include acrylamide, acrylic acid, dimethylaminomethylacrylate, methacrylic acid, and other commercially available water soluble vinyl monomers.

Much work has been done in finding a satisfactory method for the handling of high molecular weight polymers prepared from these monomers. If prepared by a solution polymerization technique, concentration of the final product is severely limited due to the final viscosity of the end product. This severely limits the concentration at which these polymers can be shipped, usually 5 to 10%, and increases handling and storage costs drastically. Many attempts have been made to perfect emulsion polymer technology for use in the preparation of these polymers so that they can be stored and shipped at relatively high concentrations and be handled with ease in order to make use of the polymer more economical.

Vanderhoff et al., U.S. Pat. No. 3,284,393 discloses a process for the preparation of water-in-oil emulsions of these polymers. While Vanderhoff does form an emulsion, his resulting emulsion is not stable, and Vanderhoff must precipitate his polymers as a solid in order to use his process economically. Anderson et al., U.S. Pat. No. 3,624,019 discloses a method for the preparation of relatively stable emulsions of finely divided water soluble polymers prepared from ethylenically unsaturated vinyl addition monomers. The Anderson et al., polymers can be readily inverted into an aqueous solution by the use of a suitable surfactant. While this process provided a great advancement to the art, Anderson's polymers have not been as stable as industrial users would like to see, often separating after only 4 to 5 weeks. While redispersible, even after separation, the redispersion step requires the use of additional equipment at the industrial site at which the polymer is to be used, and this equipment may include separate mixing tanks, mixers, and assorted piping and valves which the use of the water-in-oil emulsion of these polymers was designed to a avoid as compared to the prior standard form of shipping solid polymer which had to be dissolved through the use of this equipment.

The instant invention provides to the art a much more stable water-in-oil emulsion of a finely divided water soluble vinyl addition polymer than the Anderson et al., method. Thus, the instant invention provides to the art a water-in-oil emulsion of a finely divided vinyl addition polymer which has superior stability properties, and which like those of Anderson, may be readily inverted into an aqueous solution conveniently and with little or no extra equipment.

THE OBJECTS

An object of this invention is to provide to the art a method for the preparation of stable water-in-oil emulsions of a finely divided water soluble vinyl addition polymer.

A further object of our invention is to provide to the art a method for the preparation of stable water-in-oil emulsions of a finely divided vinyl addition polymer which can be readily inverted into aqueous solution so as to solubilize the polymer.

A further object of this invention is to provide to the art a method for the preparation of stable water-in-oil emulsions of water soluble high molecular weight acrylamide polymers and copolymers which are readily invertible into aqueous solutions so as to solubilize the polymer.

A still further object of this invention is to provide to the art a method for the preparation of stable water-in-oil emulsions of water soluble high molecular weight acrylic acid polymers and copolymers which can be readily inverted into aqueous solution so as to solubilize the polymer contained therein.

Another object of this invention is to provide to the art new, stable, water-in-oil emulsions of finely divided high molecular weight water soluble vinyl addition polymers which can be readily inverted into aqueous solutions so as to solubilize the polymer.

A further object of this invention is to provide to the art new and surprisingly stable water-in-oil emulsions of finely divided water soluble acrylamide and/or acrylic acid polymers and copolymers of high molecular weight which can be readily inverted into aqueous solutions so as to solubilize the polymer contained therein.

THE INVENTION

The basis for this surprisingly stable emulsion of this invention relies on the cohesive energy ratio, formulated by A. Beerbower and M. W. Hill in an article entitled *The Cohesive Energy Ratio of Emulsions - A Fundamental Basis for the HLB Concept*, which appeared in McCutcheon's Detergents and Emulsifier Manual, 1971, pages 223–226. Also relied on, is the HLB theory, formulated by W. C. Griffin, J. Soc. Cosmetic Chemists, 1, 311 (1949) and 5, 249 (1954).

The traditional HLB, hydrophile-lipophile balance theory, which has been relied on by chemists for many years predicts that stable water-in-oil emulsions can be formulated at HLB values only between 4–6. By applying the cohesive energy theory, and selecting suitable solvents and emulsifiers stable water-in-oil emulsions having HLB values between 7–9 can be formed which have greater stability than those formed at the traditional range and which exhibit superior properties.

The water-in-oil emulsions of the present invention contain:
1. from between 10–50% by weight of a finely divided particle of water soluble vinyl addition polymer;
2. from 5–75% by weight of the emulsion of an aliphatic hydrocarbon liquid;
3. from 70–95% by weight of the emulsion of an aqueous phase consisting of water and finely divided water soluble vinyl addition polymer (of step 1);
4. from about 0.25–10.0% by weight of a hydrophobic surfactant or surfactants capable of forming a stable emulsion of the monomers.

A water-in-oil emulsion polymerization method for making polymers and copolymers of water soluble ethylenic unsaturated monomers is used which method comprises forming a water-in-oil emulsion of the group consisting of a water-soluble ethylenic unsaturated monomer having a water solubility of at least 5 weight percent and aqueous solutions thereof, in an inert hydrophobic liquid organic dispersion medium containing between 0.25 and 10 percent by weight of a water-in-oil emulsifying agent, wherein the proportion of aqueous phase ranges between 70 and 95 percent of the emulsion heating the emulsion under free radical forming conditions to polymerize monomer in a disperse phase in said dispersion medium and recovering the polymerized latex product; the improvement which comprises using as the inert hydrophobic liquid organic dispersion medium, an aliphatic hydrocarbon liquid and one or more water-in-oil emulsifying agents whereby an emulsion is formed having a cohesive energy ratio within the range of 1.0 to 3.0.

In the first step of forming a stable water-in-oil emulsion of a finely divided vinyl addition polymer having a cohesive energy ratio of from 1.0 to 3, a suitable hydrocarbon liquid must be selected for the continuous phase of our emulsion system. The cohesive energy of the hydrocarbon liquid is determined essentially by three parameters the London energy coefficient ($\delta d$) or solubility parameter, the Keesom energy coefficient ($\delta p$), and the hydrocarbon bonding coefficient energy ($\delta h$).

Cohesive energy can be broken down into three groups of distinct energies. One, the London cohesive energy ($\delta p$) is a fundamental property of all matter and is the primary glue of the liquid and solid state. It arises from the multitude of fluctuating dipoles created by the relative instantaneous position of nuclei and electrons of two molecules in close proximity. London called this energy "dispersion" because of its relation to the prismatic refraction of light, an unfortunate choice when colloidal dispersion is under discussion. It is omnidirectional and is highly dependent upon the distance between molecules, and is the only cohesive energy between nonpolar portions of the molecules.

The Keesom energy coefficient ($\delta d$) is a measure of the permanent dipole and molecules composed of atoms of differing electronegativity. It is highly directional and depends on the relative orientation and distance between molecules. It occurs only between molecules of a polar character.

Hydrogen bonding cohesive energy ($\delta h$) arises from unique hydrogen bridge between two electronegative atoms and same or different molecules. Again, it is highly directional and depends on the relative orientation and distance between atoms and molecules. It occurs only in and between molecules containing a hydrogen atom bonded to a electronegative atom.

Ideally, the organic liquid selected as the continuous phase for our emulsion systems will have a London cohesive energy value of between 7.0 – 8.3 Hildebrand units. The London cohesive energy is also known as the solubility parameter, and is given for many solvents and is easily calculated by using well known methods including determining the surface tension in dynes per centimeter.

The Keesom cohesive energy as expressed in Hildebrand units should be very low, and approach zero and not be greater than 1 in our preferred organic liquid. This is due to the fact that our preferred organic liquids do not contain functional groups which would give a homodipole effect.

The hydrogen bonding cohesive energy like the Keesom cohesive energy is expressed in Hildebrand units and should not be greater than 1 for the preferred organic liquids. Ideally, the hydrogen bonding energy coefficient should approach 0. This is due to the fact that our preferred organic liquids do not contain the functional groups which would give hydrogen bonding between molecules.

Also important in selecting a suitable organic liquid for the continuous phase of the emulsions in this invention is the molar volume (V). This figure is merely the molecular weight divided by the density and can be found readily for all solvents, and mixtures of solvents using either the molecular weight, or average molecular weight and density which is calculated by well known methods. Ideally, the molar volume of our preferred organic liquids should be between 100 and 300 cubic centimeters.

In viewing the above, it should be noted that due to the parameters selected the preferred organic liquids will be aliphatic and will furthermore not contain functional groups which could cause a permanent dipole movement. Also, the preferred organic liquid should be of nonpolar character. As a result of this, our preferred solvents are aliphatic organic liquids having the above mentioned parameters. The organic liquids selected for use in this invention should contain less than 20% aromatics. Ideally, the preferred hydrocarbon liquid should contain less than 10% aromatics.

SUMMARY

In conclusion, the preferred organic liquids chosen for use in our invention should have the following characteristics:

a. A London energy coefficient ($\delta d$) of between 7.0 to 8.3 Hildebrand units
b. A Keesom coenergy coefficient ($\delta p$) approaching 0 Hildebrand units and not exceeding 1 Hildebrand units.
c. A hydrogen bonding cohesive energy coefficient ($\delta h$) approaching 0 and not exceeding 1 Hildebrand units;
d. A molar volume of between 100 to 300; and
e. An aromatic content of less than 20% and preferably less than 10%.

It is important for the purposes of our invention that the molar volume, London cohesive energy coefficient, the Keesom energy coefficient, and hydrogen bonding coefficient be adjusted to the levels discussed above in order to obtain an emulsion having a cohesive energy ratio ($R_o$) within the range of 1.0 to 3.0.

THE WATER-IN-OIL EMULSIONS

The oils used in preparing these emulsions may be selected from a large group of organic liquids which include liquid hydrocarbons and substituted liquid hydrocarbons.

A preferred group of organic liquids are the hydrocarbon liquids which include aliphatic compounds. Thus, such organic hydrocarbon liquids as mineral oils, kerosenes, and, in certain instances, petrolatums may be used. A particularly useful oil from the standpoint of its physical and chemical properties is the branch-chain isoparaffinic solvent sold by Humble Oil & Refining Company under the trade name "ISOPAR M." Typical specifications of this narrow-cut isoparaffinic solvent are set forth below in Table I:

TABLE I

| Specification Properties | Minimum | Maximum | Test Method |
| --- | --- | --- | --- |
| Gravity, API at 60/60° F | 48.0 | 51.0 | ASTM D 287 |
| Color, Saybolt | 30 | | ASTM D 156 |
| Aniline point, ° F | 185 | | ASTM D 611 |
| Sulfur, p.p.m. | | 10 | ASTM D 1266 (nephelometric mod). |
| Distillation, ° F: | | | |
| IBP | 400 | 410 | ASTM D 86 |
| Dry Point | | 495 | |
| Flash point,° F. (Pensky-Martens closed cup). | 160 | | ASTM D 93 |

1. Average molecular weight: 157
2. Density .688 g/cc
3. $\delta d = 7.4$ $\delta h = 0$ $\delta p = 0$
4. $V_L = 228$ Kerosene is also a preferred oil within the scope of my invention. The amount of oil used in relation to the water to prepare the emulsion may be varied over wide ranges. As a general rule, the amount of oil-to-water may vary between 5:1–1:10 with preferable emulsions being prepared in the ratio of 1:2 to 1:10. These ratios are illustrative of emulsions that can be prepared in the ratio of 1:2 to 1:10. These ratios are illustrative of emulsions that can be prepared, although it should be understood that the invention is not limited thereby.

THE CHOICE OF SURFACTANTS

In the choice of a suitable surfactant for the preparation of the water-in-oil emulsion of this invention it is important to look at the lipophile tails of the molecules to be considered. While only one surfactant need be used, it is oftentimes advisable to use two or more surfactants to obtain a better balance.

The surfactants chosen for use in our invention should have solubility parameters (London energy coefficient) and molecular volumes as close to the aliphatic organic liquids selected as possible. Ideally, the solubility parameters and molar volumes of the surfactants chosen should be equal to that of the aliphatic hydrocarbon liquid. However, most commercially available surfactants do not have the same characteristics as the organic liquids selected, and surfactants can be blended to achieve closer ratios. For the purposes of my invention we prefer to blend two or more surfactants together to obtain an additive solubility parameter so that their lipophile-tails are within plus or minus one Hildebrand unit of the aliphatic organic liquid chosen.

Also, the molar volume of the lipophile tails of the surfactants are also additive, and are chosen to correspond to within plus or minus 10% of the organic aliphatic organic liquid chosen. The lipophile tails of the surfactants chosen for use in preparing the emulsions of this invention are admixed in proportions so that their molar volumes, and cohesive energies are additive in accordance with the percentages of each lipophile tail used.

Once suitable lipophile tails are found and they are blended in proper proportion mathematically so that their solubility parameters and molar volumes are equated to those of the hydrocarbon liquid, the hydrophillic portion of these molecules must be determined.

In the theory proposed by Beerbower, $R_o$ is defined as the cohesive energy ratio of the emulsion. It is known that for water-in-oil emulsions $R_o$ must be greater than one. However it cannot be much greater than one. We have found that in order to produce stable water-in-oil emulsions of finely divided vinyl addition polymers $R_o$ should be in the range of 1.0 to 3. With closer experimentation we have found that emulsions have a $R_o$ value of approximately 1.0 may have very poor heat stability and may tend to break on heating. Emulsions having $R_o$ values greater than 3 will often break, and those having values slightly below 3, but above around 2.3 tend to be extremely stable which does not allow for the later inversion of the emulsion which is an important step in this invention. Therefore, we have found that the ideal $R_o$ should be in the range of 1.3 to 2.2.

It is important in the understanding of our invention that while the cohesive energy ration ($R_o$) of the emulsion must be between 1.0 to 3.0, it is a different entity than the cohesive energies used in the choice of the organic liquid, and surfactants. The calculated R value being the "theoretical" ratio between the lipophilic and hydrophilic portions of the total emulsion, and necessary to choose suitable surfactants for our invention.

Knowing that $R_o$ should be in this range it is possible to select suitable hydrophile tails for the lipophile sections of the surfactant molecules previously selected. By using the equation proposed by Beerbower in his article:

$$R_o = \frac{V_L \,[\delta d^2 + 0.25\, \delta p^2 + 0.25\, \delta h^2]_L}{V_H \,[\delta d^2 + 0.25\, \delta p^2 + 0.25\, \delta h^2]_H}$$

wherein:
  $V_L$ is the molar volumes of the lipophile
  $V_H$ is the molar volume of the hydrophile
  $d$ is the solubility parameter (London Cohesive Energy) in Hildebrands
  $p$ is Keesom cohesive energy
  $h$ is the hydrogen bonding cohesive energy and the subscripts L and H indicate lipophile and hydrophile respectively It is evident that the denominator which is based on the hydrophilic portion must be less than the numerator which is composed of the hydrophobic portion in order to obtain an $R_o$ of the preferred values. By knowing the molar volume and solubility parameters of possible hydrophile portions of the molecules, and by referring to published values for these figures as well as experimental results, one can pick suitable surfactants for the desired hydrophile and lipophile tails.

Knowing the molar volume and solubility parameter of possible hydrophile portions of the molecule, one can pick suitable surfactants having the desired properties. In choosing the surfactants useful in our invention and in combining the hydrophile lipophile parts of the surfactant molecule, it is important to match the surfactant chemically as well as by their parameters. Thus, for use in an unsaturated hydrocarbon oil, one would try to obtain an unsaturated surfactant having the above desired properties. Likewise, in the termination of hydrophile and hydrophobic groups one must pick groups that are reactive to each other, and hence available.

Once the desired surfactants have been found, the hydrophile-lipophile balance (HLB) of the emulsion is found using the equation:

$$HLB = \frac{\frac{20}{1+k}}{[\delta d^2 + 0.25\ \delta p^2 + 0.25\ \delta h^2]_L}$$

where
k = 139; $d$, $p$, and $h$ are the solubility parameter, Keesom cohesive energy and hydrogen bonding cohesive energy respectively of the organic liquid used as the continuous phase for the emulsion, and L indicates lipophile Once suitable surfactants have been found, and providing that the suitable surfactants provide a R value within the preferred range the hydrophile-lipophile balance of the emulsion may be calculated using this above equation and knowing the surfactants selected one can through the use of the HLB value obtained provide suitable emulsifiers for this invention.

It is important to remember that the blend of surfactants chosen will be based on the calculation done to find the suitable lipophile portion and this ratio should not be changed. However, in order to obtain a surfactant blend containing the hydrophile and lipophile tails selected which match the $R_o$ value, and which furthermore give a HLB value according to the above equation suitable materials can be added onto the emulsifier "chain" in order to increase or decrease its HLB. As an example, the emulsifier selected may have an alkylene oxide added to it in order to increase its HLB number. Thus, as an example, from 1 to 20 moles of an alkylene oxide may be added to a suitable surfactant in order to raise its HLB value proportionately to the number of moles of alkylene oxide added.

Thus, the emulsions of our invention typically have HLB values of between 7 to 9 wherein the HLB values of previous water-in-oil emulsions have been in the order of 4 to 6. This change in HLB provides to the emulsions in my invention higher stability, lower particle size, and since for unexplained reasons the polymerization has kinetics similar to solution polymerization, higher molecular weight polymer can be obtained.

Experiment has shown that polyacrylamide emulsions prepared by the Anderson reference, U.S. Pat. No. 3,624,019 and when similar emulsions prepared by this invention are compared, the emulsions of this invention have intrinsic viscosities 2 to 5 units higher using identical starting materials.

THE EMULSION

The level of surfactant chosen for use in our invention should be between 0.25 to 10% by weight of the emulsion. This factor is not critical, however with higher levels of surfactant within the range giving greater stability of the finished product while maintaining the emulsions unique ability to invert readily in aqueous solutions. Preferably, the surfactant is added at a 1.3 to 4.0% by weight of the emulsion. More preferably, we prefer to add between 1.5 to 2.5% by weight of the emulsion. While there is no formula for determining the specific amount of surfactant to be employed, we have used the above values with success and have produced stable emulsions. Occasionally, however for unexplained reasons an unstable emulsion will be formed using these surfactants. It is then oftentimes necessary to either (1) add more emulsifier, or (2) change one of the emulsifiers so that the HLB is changed slightly within the ranges indicated above. Since the equation given is only accurate to plus or minus 1 HLB unit experiments should be run to determine whether the HLB of this system should be raised or lowered.

This procedure is easily followed by looking at commercially available emulsifiers and their known HLB's. By knowing their chemical structure (i.e. hydrophile or lipophile) suitable surfactants containing these properties and matching the desired HLB balance may be found.

Generally, the surfactants useful in our invention will be those generally known as lipophilic and are enumerated in many references, especially Anderson et al., U.S. Pat. No. 3,624,019.

THE WATER-IN-OIL EMULSIONS OF FINELY DIVIDED WATER SOLUBLE POLYMER

This invention is directed to a stable water-in-oil emulsion which contains dispersed therein finely divided particles of water-soluble vinyl addition polymer in the concentration of at least 10% based on emulsion. This can be termed as a polymer containing emulsion.

From a commercial standpoint it is beneficial that the polymer emulsions thus described be stable, yet at the same time contain relatively large concentration of polymer. One method of assuring that the polymer does not precipitate when dispersed in the emulsion is that the particle size of the polymer be as small as possible. Thus, polymers dispersed in the emulsion in accordance with this invention are quite stable when the particle size is within the range of 1 micron. The preferred particle size of polymer particles contained in the water-in-oil emulsion is below 1 micron. In the most preferred embodiment of this invention the polymer particles contained within the water-in-oil emulsion should have a particle size whereby at least one of their dimensions is less than one micron.

The stable water-in-oil emulsion of this invention comprises:
1. an aqueous phase;
2. an inert hydrophobic liquid; and
3. a water-in-oil emulsifying agent.

The primary feature of this polymer containing emulsion is that it remains stable with passage of time. The stability which this composition exhibits as defined above is the maintenance of the dispersion of the polymer particles throughout the emulsion for a period of at least three months at which time the dispersion can be performed only with slight agitation.

The polymer containing emulsion of this invention is comprised of an aqueous phase ranging between 70 to 95% by weight of the emulsion. The aqueous phase is defined as the sum of polymer or copolymer and the water present in the composition. The preferred range is between 75 and 90% by weight of the emulsion. The most preferred range is between 75 and 85% by weight of the emulsion.

The present invention has a polymer concentration between 10 and 50% by weight of the emulsion. A preferred range is between 15 and 40% by weight of the emulsion. The most preferred range is between 20 and 35% by weight of the emulsion.

These polymers are well-known to the art and have been described in numerous publications and patents. The polymers most commonly used in many industrial applications are acrylamide polymers which include polyacrylamide and its water-soluble copolymeric derivatives such as, for instance, acrylamide-acrylic acid, and acrylamide-acrylic acid salt copolymers which contain from about 95–5% by weight of acrylamide. Also useful are copolymers of acrylamide with other vinyl monomers such as maleic anhydride, acrylonitrile, dimethylaminoethylmethacrylate and the like. It is preferred in the practice of this invention to use acrylamide polymers which are water-soluble and which contain at least 5% by weight of acrylamide.

Other water-soluble vinyl polymers are described in detail in the following U.S. Pat. Nos. 3,418,237, 3,259,570 and 3,171,805.

In examining the disclosures of these patents it will be seen that the water-soluble polymers may be either cationic or anionic and, in some instances, the ionic charges are sufficiently slight so that the polymers may be considered as nonionic.

For example, water-soluble polymers and copolymers of allyl, diallyl amines, or dimethylaminoethylmethacrylate are cationic. Polymers such as polyvinyl alcohol are nonionic, and polymers such as polyacrylic acid or polystyrene sulfonates are anionic. All of these polymers may be used in the practice of the invention. It is important for the purposes of our invention that the water soluble polymers chosen be made from monomers having a solubility of at least 5 weight percent in water.

The molecular weight of the polymers described above may vary over a wide range, e.g. 10,000 – 25,000,000. The invention, however, finds it greatest usefulness in preparing aqueous solutions or dispersions of these polymers and, in particular, acrylamide polymers whose molecular weight are in excess of 1,000,000. Polymers having higher molecular weights are more difficultly dissolved in water and tend to form extremely viscous solutions at relatively low concentrations.

The invention is capable of producing rapidly aqueous solutions of the water-soluble vinyl addition polymers having concentrations within the range of 0.1–20% by weight. The invention most often finds usefulness when it is desired to form aqueous solutions of polymers having a solution concentration of 0.2–2.0% by weight.

While the aliphatic hydrocarbon oils useful in this invention have already been described, they should comprise between 5 to 70% by weight of the emulsion. The preferred range is between 10 and 50% by weight of the emulsion. The most preferred range is between 20 and 30% by weight of the emulsion. Often it is advantageous to use more oil than absolutely necessary in order to form a more fluid emulsion. The addition of greater amounts of aliphatic hydrocarbon liquid than absolutely necessary to produce a stable emulsion will usually form a much less viscous and more free flowing final product.

The water-in-oil emulsifying agents for use in the emulsion of our invention have been discussed in great detail above and will not be elaborated on here. However, these emulsifying agents should be selected in amounts ranging of between 0.1 to 10% by weight of the emulsion. The preferred range is between 0.1 and 7% by weight of the emulsion. The most preferred range is between 0.25 and 5% by weight of the emulsion.

The stable water-in-oil emulsion of the present invention exhibits the unique ability of rapidly dissolving into aqueous solution. The polymer containing emulsion releases the polymer in water in the presence of surfactant in a very short period of time when compared to the amount of time required to dissolve a solid form of the polymer. This inversion technique is described in U.S. Pat. No. 3,624,019, Anderson et al., which is herein incorporated by reference.

In order to better illustrate our invention the following examples are presented.

EXAMPLE I

This is an example for the formulation of the emulsifiers of a stable water-in-oil emulsion of polyacrylamide using kerosene as the inert hydrophobic liquid.

I. The solubility parameters of kerosene were found to be:
  A. Molecular Volume ($M_v$) = 263
  B. $\delta d = 7.8$, $\delta p = 0$, $\delta h = 0$
  C. Mainly straight chain hydrocarbon II. The solubility parameters required in the lipophilic portion of the emulsifier are then:
  A. $M_v = 263 \pm 10\%$
  B. $\delta d = 7.8 \pm 1$
  C. Mainly straight chain configuration
  D. $R_o$ value must be greater than 1.0

III. Possible lipophilic tails were examined as to their parameters in order to meet those of II (above).

| | | | |
|---|---|---|---|
| A. | Stearate | $M_v = 293.2$ | $\delta d = 8.21$ |
| B. | Laurate | $M_v = 195.7$ | $\delta d = 8.09$ |
| C | Oleate | $M_v = 283.8$ | $\delta d = 7.60$ |
| D. | Palmitate | $M_v = 260.2$ | $\delta d = 8.2$ |

IV. Two or more of the above tails were blended arithmetically to obtain a lipophilic blend meeting the requirements of step II. We chose to use 3 emulsifiers.

| | | | |
|---|---|---|---|
| 74% stearate | | 216.968 | 6.0754 |
| 16% laurate | | 31.312 | 1.2944 |
| 10% oleate | 28.38 | .760 | |
| | $M_v =$ 276.66 | $dd =$ 8.13 | |

V. The HLB was then determined using the formula:

$$HLB_o = \frac{\frac{20}{1+k}}{[\delta d^2 + 0.25\, \delta p^2 + 0.25\, \delta h^2]_L}$$

wherein $k = 139$
For the blend selected in Step IV,
  $\delta d = [0.74\, \delta d\text{ stearate} + .16\delta\text{ laurate} + .1\delta\text{ doleate}]^2$
  $\delta d = 66.08$ $$HLB_o = \frac{\frac{20}{140}}{66.08} = 9.4 \pm 1$$

VI. Sorbitan, being a common hydrophile, and being commercially available was chosen as the hydrophilic portion of the above lipophiles on the basis of its HLB when combined with the three lipophilic tails previously selected.

$$R_o = \frac{V_L \, [\delta d^2 + 0.25 \, \delta p^2 + 0.25 \, \delta h^2]_L}{V_H \, [\delta d^2 + 0.25 \, \delta p^2 + 0.25 \, \delta h^2]_H}$$

$$R_o = \frac{284.53 \, [66.08]}{65.5 \, [81 + 3.61 + 53]}$$

$$R_o = 2.086$$

VII. By observing the inherent HLB of the emulsifier blend proposed in VI and VII it is found that the hlb cannot be achieved therefore, an ethylene oxide adduct of one of the chosen emulsifier must also be added. In this case Tween 61 (Sorbian mono stearate + 4 moles of EO) is used.

A. Calculated $R_o$ for Tween 61 = 1.548

B. Calculated HLB for 72% Tween 61 and 28% emulsifier blend is 8.4 (within required range).

VIII. Final Emulsifier Blend is:

| A. | Emulsifiers(*) | % by weight |
|---|---|---|
| | 1) Span 20 | & 4.5 |
| | 2) Span 60 | 20.7 |
| | 3) Tween 61 | 72.0 |
| | 4) Span 80 | 2.8 | available commercially from ICI America, Inc. Span 20 is sorbitan monolaurate; Span 60 is sorbitan monostearate; Tween 61 is POE (4) sorbitan monostearate; Span 80 is sorbitan monooleate.

| B. | HLB of Blend = | 8.4 |
| C. | $R_o$ of Blend = | 1.699 |
| D. | $M_v$ of Blend (lipophile) = | 288.4 |
| E. | $\delta d$ of Blend = | 8.18 |

B. HLB of Blend = 8.4
C. R of Blend = 1.699
D. M of Blend (lipophile) = 288.4
E. $\delta d$ of Blend = 8.18

IX. Difference between kerosene solubility parameter and that of emulsifier blend:

A. $\Delta\Delta M$ = 25 (within specification)
B. $\Delta \delta d$ = .35 (within specification)
C. $R_o$ is greater than 1.5

EXAMPLE II

By using the emulsifier/inert hydrophobic liquid formulation of Example I, a polyacrylamide polymer in a water-in-oil emulsion was prepared. To a 1.5 liter stirred resin flask equipped with condenser, thermometer, agitator, nitrogen sparge tube and inlet port was added 270.0 g. of acrylamide dissolved in 457.7 g. of deionized water. With agitation, 20.0 g. of the emulsifier blend of Example I was added in 250.0 g. of kerosene. With agitation, and purging with nitrogen, 4.05 g. of a 10% solution of Vazo 64 (azobisisobutyronitrile), a free radical catalyst in kerosene was added. The reaction was allowed to proceed. A stable water-in-oil emulsion of polyacrylamide was obtained as the polymerization product.

This polymer latex was readily invertible into water by the methods described in Anderson et al., U.S. Pat. No. 3,624,019. The emulsion polymer so produced had an average particle size of less than 1 micron.

We claim:

1. A process of the type wherein a water-in-oil emulsion polymerization method for making polymers and copolymers of water-soluble ethylenic unsaturated monomers is used which method comprises forming a water-in-oil emulsion of the group consisting of a water-soluble ethylenic unsaturated monomer having a water solubility of at least 5 weight percent and aqueous solutions thereof, in an inert hydrophobic liquid organic dispersion medium containing between 0.25 and 10% percent by weight of a water-in-oil emulsifying agent, wherein the proportion of aqueous phase ranges between 70 and 95 percent of the emulsion, heating the emulsion under free radical forming conditions to polymerize monomer in a disperse phase in said dispersion medium and recovering the polymerized latex product; the improvement which comprises using as the inert hydrophobic liquid organic dispersion medium an aliphatic hydrocarbon liquid and one or more water-in-oil emulsifying agents whereby an emulsion is formed having a cohesive energy ratio within the range of 1.0 to 3.0.

2. The method of claim 1 wherein the average particle in the dispersed phase has at least one dimension less than 1 micron.

3. The method of claim 1 wherein the aliphatic hydrocarbon liquid has a London Force cohesive energy of from 7.0–8.3 hildebrand units and a molar volume of from 100–300 cubic centimeters.

4. The method of claim 1 wherein the water-in-oil emulsifying agent is selected so that its lipophile tail has a molar volume ± 10% of the molar volume of the aliphatic hydrocarbon liquid.

5. The method of claim 1 wherein the water-in-oil emulsifying agent is selected so that its lipophile tail has a London force cohesive energy within ± 1 hildebrand unit of the London cohesive energy of the aliphatic hydrocarbon liquid.

6. The method of claim 1 wherein the aliphatic hydrocarbon liquid contains less than 20% aromatics.

7. The method of claim 1 wherein the aliphatic hydrocarbon liquid contains less than 10% aromatics.

8. A stable water-in-oil emulsion of finely divided water soluble polymer of a water soluble ethylenically unsaturated water soluble monomer, said emulsion comprising:

A. From 70–95% by weight of the emulsion of an aqueous phase consisting of water and a finely divided water soluble polymer.

B. From 5–70% by weight of the emulsion of an aliphatic hydrocarbon liquid; and

C. from 0.25 – 5.0% by weight of the emulsion of a hydrophobic surfactant; said emulsion being further characterized as having a cohesive energy ratio of from 1.0 to 3.0.

9. The water-in-oil emulsion of a finely divided water soluble polymer of claim 8 wherein the aqueous phase contains from 10–50% by weight of the total emulsion of the finely divided water soluble polymer.

10. The water-in-oil emulsion of a finely divided water-soluble polymer of claim 8 wherein the average particle size of the dispersed phase has at least one dimension less than 1 micron.

11. The water-in-oil emulsion of a finely divided water-soluble polymer of claim 8 wherein the aliphatic hydrocarbon liquid has a London Force cohesive energy of from 7.0–8.3 Hildebrands and a molar volume of from 100–300 cubic centimeters.

12. The water-in-oil emulsion of a finely divided water-soluble polymer of claim 8 wherein the hydrophobic surfactant is selected so that its lipophile tail has a molar volume ± 10% of the molar volume of the aliphatic hydrocarbon liquid.

13. The water-in-oil emulsion of a finely divided water soluble polymer of claim 8 wherein the aliphatic hydrocarbon liquid contains less than 20.0% aromatics.

14. The water-in-oil emulsion of a finely divided water soluble polymer of claim 8 wherein the ethylenically unsaturated water soluble monomer is acrylamide.

15. The water-in-oil emulsion of a finely divided water soluble polymer of claim 8 wherein the ethylenically unsaturated water soluble monomer is acrylic acid.

16. The water-in-oil emulsion of a finely divided water soluble polymer of claim 8 wherein the ethylenically unsaturated water soluble monomer is dimethylaminoethylmethacrylate.

17. The water-in-oil emulsion of a finely divided water soluble polymer of claim 8 wherein the lipophile tails of the surfactants are blended in proper portion mathematically so that their solubility parameters and molar volumes are equated to those of the hydrocarbon liquid.

18. The water-in-oil emulsion of a finely divided water soluble polymer of claim 8 wherein two or more surfactants are blended together so as to obtain an additive solubility parameter within plus or minus one Hildebrand unit of the aliphatic hydrocarbon liquid.

* * * * *